United States Patent
Yang et al.

(10) Patent No.: US 10,916,907 B2
(45) Date of Patent: Feb. 9, 2021

(54) ULTRA-COMPACT OPTICAL PULSE COMPRESSOR

(71) Applicant: CARNEGIE MELLON UNIVERSITY, Pittsburgh, PA (US)

(72) Inventors: Chang Yang, Pittsburgh, PA (US); Elias Towe, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 326 days.

(21) Appl. No.: 15/937,020

(22) Filed: Mar. 27, 2018

(65) Prior Publication Data

US 2018/0287327 A1    Oct. 4, 2018

Related U.S. Application Data

(60) Provisional application No. 62/601,688, filed on Mar. 28, 2017.

(51) Int. Cl.
| | | |
|---|---|---|
| G02B 5/18 | (2006.01) | |
| H01S 3/00 | (2006.01) | |
| G02B 27/09 | (2006.01) | |
| H01S 3/23 | (2006.01) | |

(52) U.S. Cl.
CPC ........ *H01S 3/0057* (2013.01); *G02B 27/0944* (2013.01); *G02B 27/0977* (2013.01); *G02B 27/0911* (2013.01); *H01S 3/2308* (2013.01)

(58) Field of Classification Search
CPC ........ H01S 3/00; H01S 3/0057; H01S 3/2308; H01S 3/08009; H01S 3/08059; H01S 5/18319; H01S 5/105; H01S 5/1209; G02B 27/0977; G02B 27/09; G02B 27/0911; G02B 27/0944; G02B 5/1861; G02B 5/1809; G02B 5/1814; G02B 5/18; G02B 5/1842; G02B 5/1828; G02B 26/0808; B82Y 20/00; B82Y 10/00; B82Y 40/00; G03H 1/0244; G03H 2250/36; G03H 1/08; G01J 3/18; G01J 3/1804; G01J 3/1895
USPC ...................................................... 359/572
See application file for complete search history.

(56) References Cited

U.S. PATENT DOCUMENTS 6,424,669 B1 * 7/2002 Jiang ............... H01S 5/026
                                                   372/50.1
2019/0346683 A1 * 11/2019 Chua ............... H01L 21/31144

OTHER PUBLICATIONS

Treacy, E. B., "Optical Pulse Compression With Diffraction Gratings," IEEE Journ. Quant. Electronics, vol. QE-5(9), pp. 454-458, Sep. 1969.
Strickland, D., et al., "Compression of Amplified Chirped Optical Pulses", Op. Commun., vol. 55(6), pp. 447-449, Oct. 15, 1985.
(Continued)

*Primary Examiner* — William R Alexander
*Assistant Examiner* — Tamara Y. Washington
(74) *Attorney, Agent, or Firm* — Kacvinsky Daisak Bluni PLLC

(57) ABSTRACT

A uni-block optical pulse compressor which acts to manipulate an input beam with a train of pulses in such a way that the pulses returned after a round-trip though the uni-block compressor are temporally compressed as described. The device is comprised of two optically transparent dielectric blocks whose indices of refraction are larger than the ambient, and provides a compact, portable and robust means for temporally compressing long duration pulses.

16 Claims, 4 Drawing Sheets

(56) References Cited

OTHER PUBLICATIONS

Martinez, O. D., "Design of High-Power Ultrashort Pulse Amplifiers by Expansion and Recompression," IEEE Journ. Quant. Electronics, vol. QE-23(8), pp. 1385-1387, Aug. 1987.

Pessot, M., et al., "1000 Times Expansion/Compression of Optical Pulses for Chirped Pulse Amplification," Optics Communications, vol. 62(6), pp. 419-421, Jun. 15, 1987.

Lai M., et al., "Single-grating laser pulse stretcher and compressor," Applied Optics, vol. 33(30). pp. 6985-6987, Oct. 30, 1993.

* cited by examiner

ULTRA-COMPACT OPTICAL PULSE COMPRESSOR

RELATED APPLICATION

This application claims the benefit of U.S. Provisional Application Ser. No. 62/601,688, filed Mar. 28, 2017.

GOVERNMENT INTEREST

This invention was made with government support under U.S. Navy No. N66001-12-1-4202 The government has certain rights in this invention.

FIELD OF THE INVENTION

This invention is related to the field of photonics, and, in particular, to the generation of light pulses with ultra-short temporal durations, for example, in the range of femtoseconds to picoseconds. More specifically, it relates to the compression of nanosecond laser light pulses exiting an amplifying medium in a laser system.

BACKGROUND OF THE INVENTION

FIG. 1 shows the typical geometry of a conventional compressor. Input beam 1 to the compressor is a train of pulses with stretched temporal widths. The pulses pass through the one-way input mirror 2 and are then steered by mirror 3 onto diffraction grating 4. Grating 4 angularly spreads the beam according to its spectral content. Diffraction elements 4 and 11 are transmission mode gratings. A variant of these are reflection mode gratings which can be appropriately configured to achieve the same effect as discussed here. The longest wavelength component of the beam travels along the longest optical path 7 while the middle wavelength component 8 and the shortest wavelength component 9, travel along the indicated paths in FIG. 1. The different wavelength components propagate toward the second grating 11, which is parallel to the first grating 4. Grating 11 diffracts and directs the beam toward mirror 12, which retro-reflects it along the same path back toward one-way mirror 2, where it is reflected and becomes the output beam with temporally compressed pulses 13.

The operating mechanism of optical compressors is based on the dispersive property of grating elements arranged in a particular geometry. Different wavelengths of the beam travel different optical paths for a beam of a certain spectral bandwidth. In the arrangement of FIG. 1, the longer wavelength components, for instance, wavelength component 7, travel a longer distance than shorter wavelength components 8, 9. However, when the spectral components recombine at the output of the compressor, the resultant temporal width of the pulses is much shorter than what initially entered the compressor. In FIG. 1, the grating period or constant (i.e., the distance between the rulings in the grating) 5 controls the angular spread of the wavelength components.

The distance 6 between the grating pair is a critical dimension that controls the pulse compression ratio. These constraints imply that the grating constant 5 and the separation distance 6 between gratings 4 and 11 determine the required grating size 10 and the overall volume of the compressor system.

The use of diffraction grating pairs for optical pulse compression is well known in the art. However, the grating pair is only used for direct pulse compression after amplification, which produces low energy pulses. Chirped-pulse laser amplification systems are also well known. This system uses a single mode fiber as the stretcher, while a grating pair is used as the compressor. The first grating-based optical pulse stretcher and compressor system consisted of two gratings with a telescope mounted between them. The role of the telescope is to invert the dispersion. The compressor, on the other hand, is comprised of a similar grating pair but without the telescope, thus providing opposite but equal dispersion to cancel that of the stretcher. The output pulse of the composite system had a width that was almost identical to that of the original input pulse.

In chirped-pulse laser amplification systems, short pulses of light are temporally stretched by passing them through a medium called a stretcher, which typically consists of a grating pair configured in a specific geometry, or a long optical fiber that causes the component frequencies (or wavelengths) of each pulse to travel at different group velocities, leading to an increased temporal width for the overall pulse when it exits the stretcher. A normal stretcher introduces positive dispersion by speeding up the low frequency components of the pulse and slowing down the high frequency components. At the output of the stretcher, each pulse still has the same energy, but a lower pulse amplitude and a broader pulse width. A pulse with lower amplitude can be safely amplified without distortion or damage to the amplifier.

Following amplification, the original pulse width can be recovered by passing the pulse through a pulse compression system, which is usually a pair of gratings in a specific geometric configuration. The action of the compressor is to reverse the processes of the stretcher. An ideal compressor introduces negative dispersion by slowing the low frequency components of each pulse and speeding up the high frequency components. If the negative dispersion imparted to the pulse train exactly balances the initial positive dispersion, the output of the compressor is a pulse train with pulse widths as short as the original width but with a much higher pulse amplitude, due to the amplification and compression. The magnified pulse amplitudes imply very high peak powers. The typical high peak power, short pulse laser system usually has a large beam diameter because of the angular spectral spread imparted by the large gratings, which can be cumbersome and often limit design flexibility and portability of high peak power laser systems.

Current state of the art chirped-pulse amplification techniques are now capable of producing pulses with peak power levels in the multi-terawatt range and pulse widths in the femtosecond regime. The most serious handicap and limitation of using this technique for generating ultra-short, high-energy pulses, however, remains the large size of the compressor; which can often be as large as 1 cubic meter. Chirped-pulse amplification systems capable of producing short pulses with high peak powers usually have a grating-based compressor that can occupy volumes of well over a cubic meter. For many applications, this size is cumbersome and a limiting factor. Furthermore, conventional grating-based compressors are generally sensitive to minor mechanical and environmental disturbances which can impact pulse shapes.

Concerted efforts have been put into reducing the size and complexity of the grating stretcher and compressor system. The majority of these efforts include folding the optical path length in the stretcher as well as in the compressor.

SUMMARY OF THE INVENTION

With the limitations discussed above, the present invention is directed to a novel approach to substantially reducing the physical volume of a grating-based compressor used in temporal compression of long duration optical pulses in laser amplification systems. Pulse compressors are components of all laser systems based on the chirped-pulse amplification principle. This amplification scheme makes possible the generation of light pulses with peak powers in the multi-terawatt range, and with pulse durations on the order of picoseconds to femtoseconds.

The invention provides an innovative uni-block of transparent dielectric material integrated with essential optical elements to form a system capable of compressing amplified, long duration laser pulses to ultra-short widths within a limited volume. This invention can be utilized by low-powered laser systems like those found in telecommunications, but can also accommodate high-powered laser systems used for medical and various other applications.

This novel compressor design is composed of two major component blocks bonded together or formed from a single piece. Two specific embodiments are described herein, but the invention may be expressed in other embodiments as well.

DETAILED DESCRIPTION OF THE INVENTION

Figure 1:
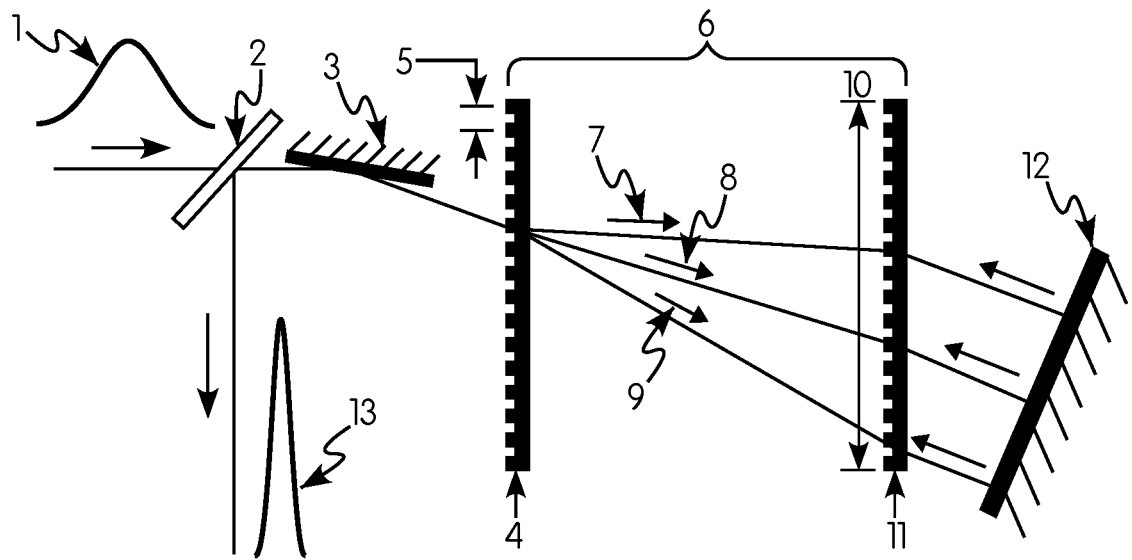
FIG. 1 is a schematic of a prior art conventional optical pulse compressor based on an open architecture design with two gratings and associated beam steering mirrors.
Figure 2:
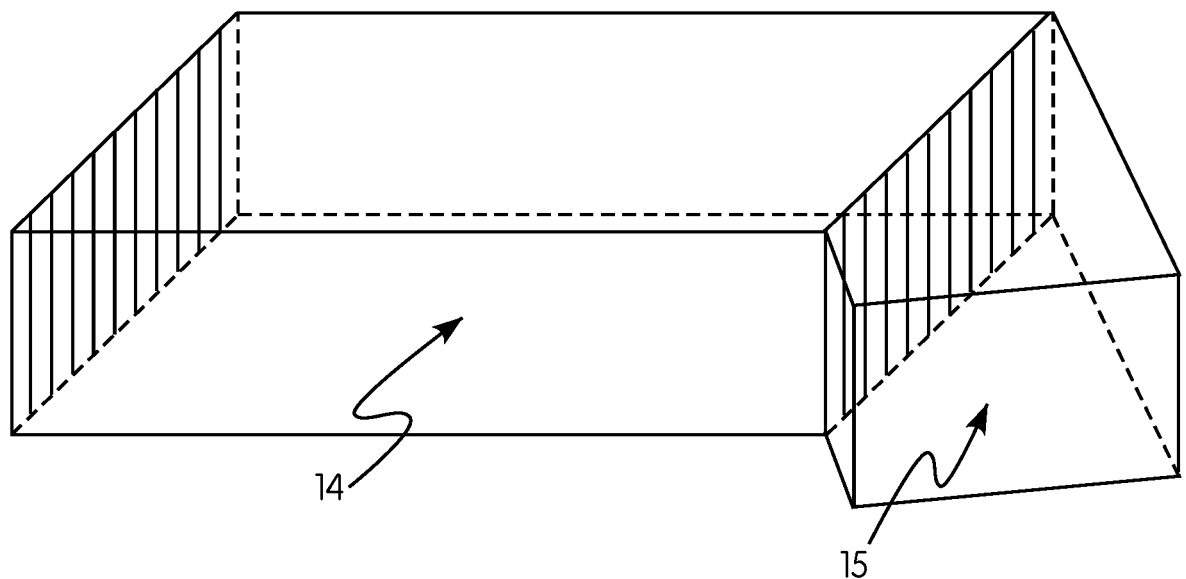
FIG. 2 shows an isometric drawing of the basic optical pulse compressor of this invention.

A first embodiment of the invention, shown in FIG. 2 comprises two canonical blocks atomically welded together to form a uni-block compressor. The first of the two blocks comprises a rectangular cuboid 14, and the second comprises a trapezoidal block 15. Both blocks 14 and 15 are solid, optically transparent dielectric materials and may, in a preferred embodiment, be fused silica glass, however, any solid, optically transparent dielectric material may be used, for example, pure glass, sapphire, acrylic glass, etc. Preferably, blocks 14 and 15 will comprise the same material, but in other embodiments, may be composed of different materials.

Figure 3:
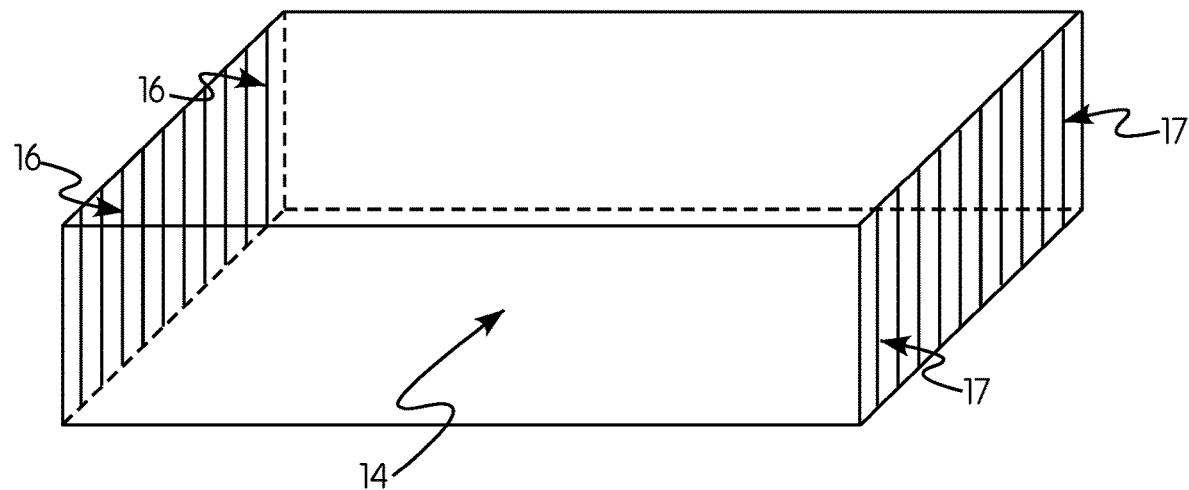
FIG. 3 depicts the primary dielectric block of the invention in the basic configuration of the compressor.

Blocks 14 and 15 preferably comprise two solid and optically transparent blocks having indices of refraction larger than the ambient. FIG. 3 illustrates the first of the two blocks 14. Both opposite, parallel faces 16, 17 at the ends of block 14 have a grating ruled thereon. The other four surfaces of the block are covered with a reflective coating, which, in a preferred embodiment, may be gold or a Bragg reflector, but other reflective materials may also be used. In all embodiments of the invention, the grating constant (i.e., the separation between the grating rulings), and the transverse size of the gratings are dictated by the spectral bandwidth of the input pulse, the desired pulse compression ratio, and the desired overall volume of the compressor system.

Figure 4:
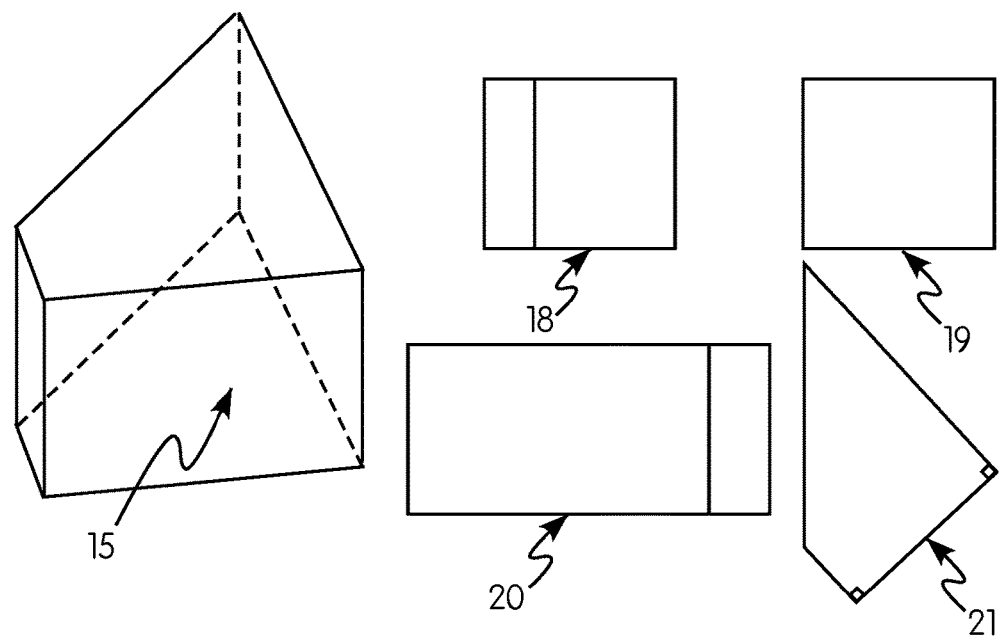
FIG. 4 shows various views of the secondary dielectric block.

The second of two blocks, trapezoidal block 15 shown in FIG. 2, is illustrated in different views in FIG. 4. View 18 is a front view of second block 15; view 19 is a rear view; view 20 is a left view; and view 21 is a top view. Trapezoidal block 15 preferably has all its surfaces, except the one that is joined to cuboid block 14, coated with a similar reflective coating.

Figure 5:
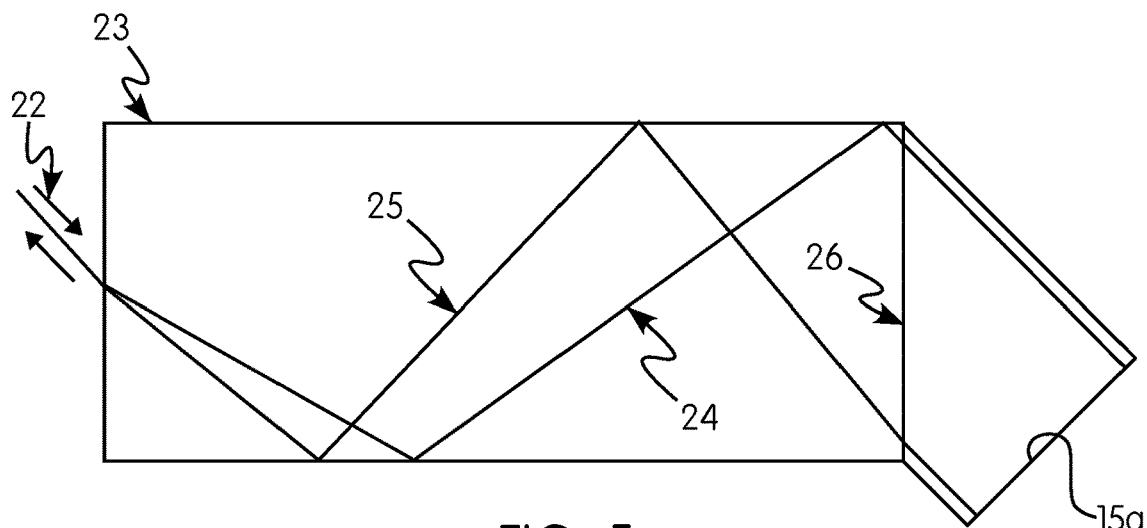
FIG. 5 illustrates the propagation of the input and output optical beamlets within the basic optical pulse compressor as viewed from the top of the device.
Figure 6:
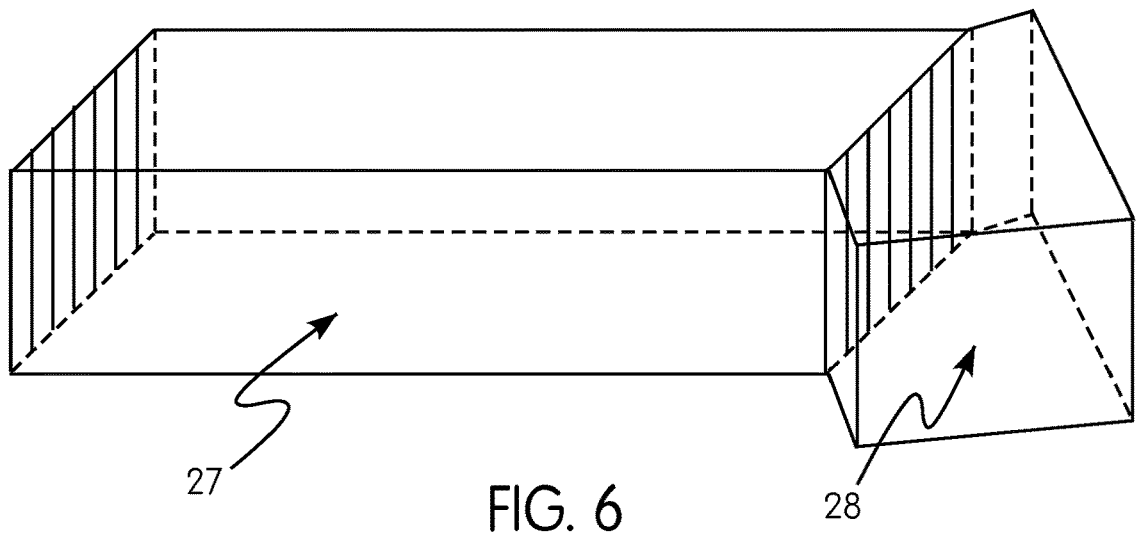
FIG. 6 is a schematic of one version of an advanced embodiment of the pulse compressor that improves on the basic embodiment depicted in FIG. 2.

A top composite view of the compressor is shown in FIG. 5, with an illustration of how light propagates from the input at the left to the right of the second block 15, and back after retro-reflection from 15 to the input of the compressor, which also serves as the output. In operation, a train of stretched pulses 22 enter the compressor from the left-hand side as indicated in FIG. 5, impinging on the first diffraction grating 23. The light is then angularly spread by diffraction, with the longest and shortest wavelength components following the paths indicated as 24 and 25, respectively. Due to the limited transverse size of the cuboid block 14, light beams 24 and 25 encounter the reflecting surfaces of the block and are thus folded back into the block for the same number of times. This process is repeated several times until the beams reach the second grating 26. FIG. 5 shows the spectral components of the beam having the center wavelength (which carries the majority of the energy of the light beamlet) being reflected an even number of times. Note that, if the number of reflections is odd, then trapezoidal block 15 would need to be rotated by 180 degrees. Note also that FIG. 5 is a model of the reflective process and does not necessarily show the actual number of reflections which occur as the beamlets traverse the cuboid block 14.

The diffraction at the second grating collimates the beamlets such that they are parallel to the original input beam 22. The beamlets propagate through the body of the trapezoidal block 15 and encounter reflecting surface 15a perpendicular to the direction of travel of the beamlets. Retro-reflection from surface 15a returns the light along the same path to the initial starting point. The returned beam is the output, with each pulse in the train of pulses temporally compressed to a much shorter width than the original input pulses, but with the amplitude of each pulse higher than that of the original amplitude.

The second embodiment of the uni-block compressor is shown in FIGS. 6-9. It is comprised of two solid, optically transparent blocks as in the first embodiment described above. Each of the blocks has an index of refraction greater than the ambient.

Figure 7:
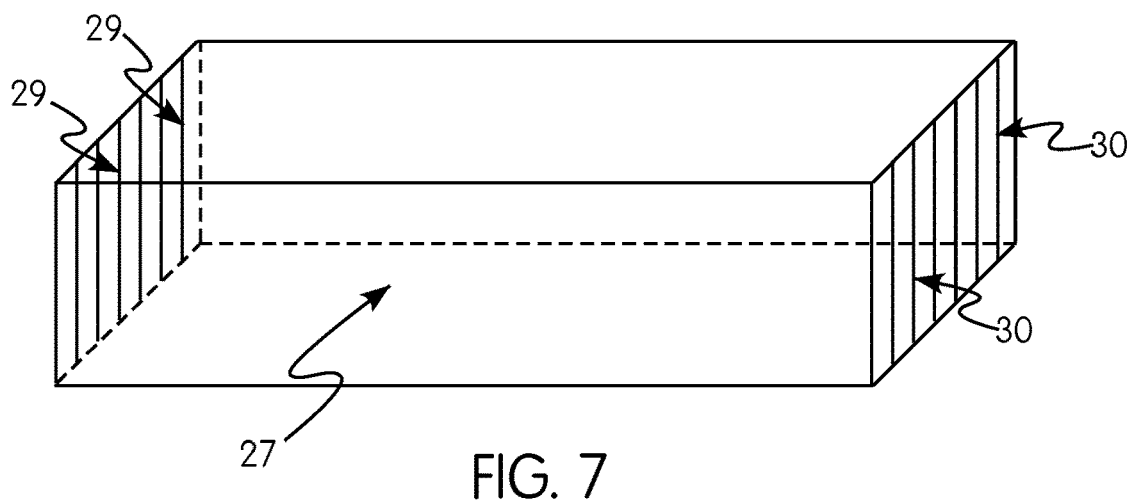
FIG. 7 shows the primary dielectric block of the advanced embodiment of FIG. 6 with integrated gratings.

FIG. 7 shows the rectangular cuboid block 27. The opposite and parallel surfaces of the block have gratings 29 and 30 ruled thereon. The other four surfaces of the block are covered with a reflective material, such as gold, or, preferably, in this embodiment, a distributed Bragg reflector. In other embodiments, only the two services reflecting the light beams need to be coated with a Bragg reflector, however, it is preferable that all four sides be coated with a reflective coating to prevent ambient light from entering the structure. The use of Bragg reflectors in this embodiment offers a way to eliminate the influence of the different times of half-wave loss introduced by different times of reflection on lossy material for different spectral components of the input beam.

Figure 8:
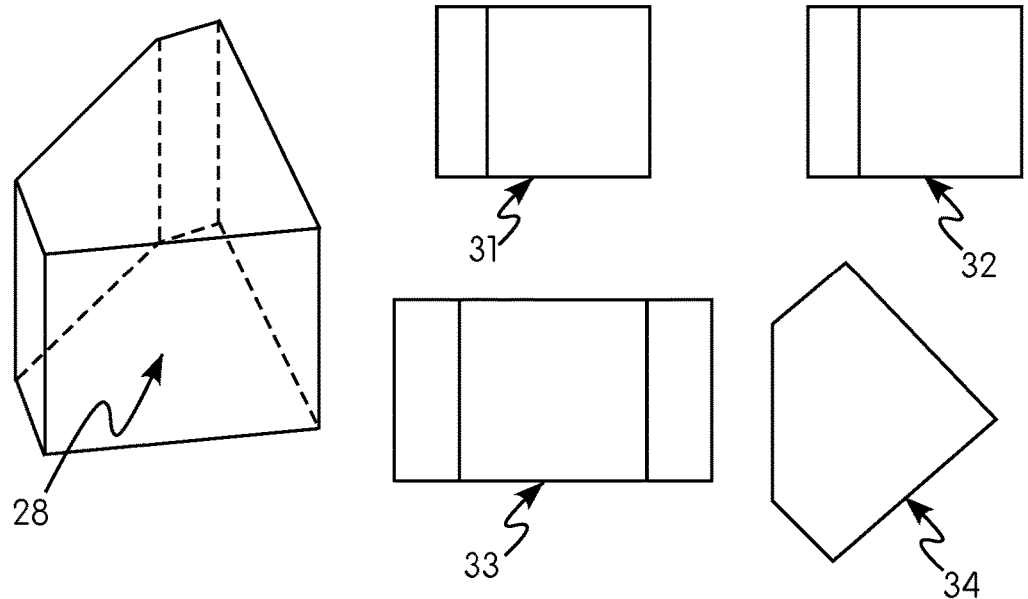
FIG. 8 shows various views of the secondly dielectric block of the advanced embodiment of FIG. 6.

FIG. 8 illustrates the different perspectives of block 28, which, in one aspect of this embodiment, is an irregularly shaped heptahedron. View 31 is a front view; view 32 is a rear view; view 33 is a left view, and view 34 is a top view. Preferably, all surfaces of heptahedron block 28, except for the surface fused to the rectangular cuboid block, are coated with a reflective material.

Figure 9:
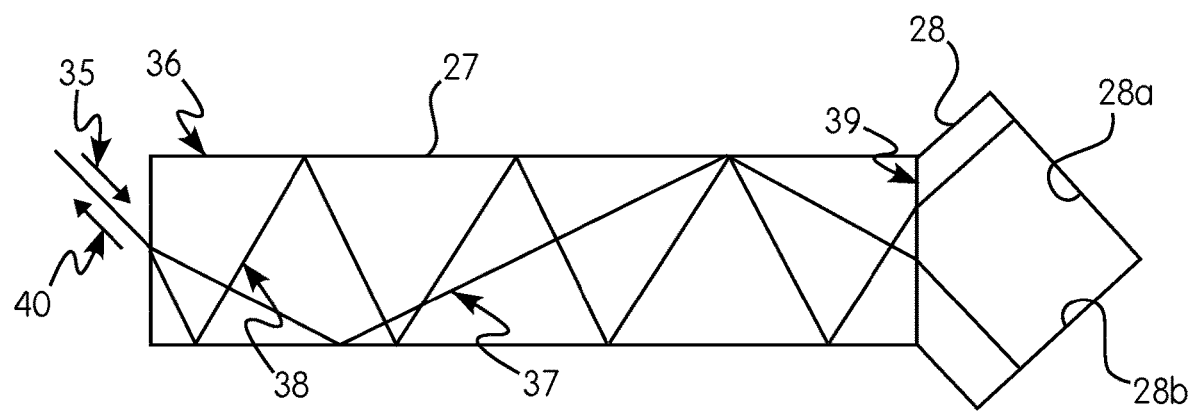
FIG. 9 shows the propagation paths of the input and output beamlets in the advanced embodiment of the compressor as viewed from the top of the device.

The top composite view of the bonded blocks in this embodiment of the compressor shows, in FIG. 9, how the light propagates from the input, through the compressor, to the retro-reflecting surfaces and back to the input (which also serves as the exit).

In operation, a train of stretched pulses 35 enter the cuboid block 27 from the left-hand side as indicated in FIG. 9, propagating through the first diffraction grating 36. The light is then angularly spread by the grating, with the longest and shortest wavelength components following the paths indicated as 37 and 38, respectively. Beamlets 37 and 38 encounter distributed Bragg reflectors on the sides of cuboid block 27 which fold them back and forth as they travel along block 27. This process is repeated several times until the beamlets reach the second grating 39. Diffraction from this grating creates the beamlets that are retro-reflected from the surfaces 28a and 28b of the heptagonal block. Note that beamlets reflected an even number of times within cuboid block 27 are reflected from surface 28b, while the beamlets that are reflected an odd number of times are reflected by surface 28a. The retro-reflected beamlets travel back to the input (which becomes the output). Preferably, the angle between surfaces 28a and 28b is 90 degrees. Note that the number of reflections shown in FIG. 9 is for illustration purposes only and does not necessarily represent the actual number of reflections experienced by a beamlet as it traverses the cuboid block 27.

While block 28 is shown as a heptahedron, a shape of any number of sides could be used, as long as surfaces 28a and 28b are at an angle which enables them to retro-reflect beamlets 37 and 38. Note that embodiments are possible in which only the surfaces which retro-reflect the light beamlets are coated with the reflective material, however, coating all external surfaces prevents stray light from entering the structure. The action of the second grating 39 on the beamlets makes it necessary for two surfaces 28a and 28b on block 28 to be perpendicular to the beamlets incident onto them, such that the beamlets encounter the reflective surface at a 90 degree angle, thereby allowing them to be retro-reflected. Additionally, while the preferred shape of block 27 is a rectangular cuboid, other shapes can work as well, however, predicting the performance of other shapes in advance would be challenging.

In other embodiments, the compressor may comprise a monolithic structure of a single solid block of optically transparent material, with a first portion being of generally rectangular, cuboid shape, such as shown in FIG. 3 or 7, with a second portion of indeterminate in shape, but having one or more surfaces defined such that a light beamlet entering the second portion from the first portion is incident on one of the one or more sides (internal surfaces) of the second portion such that the beamlet is retro-reflected (i.e., the beamlet strikes the surface at a 90 degree angle and is reflected back along the same path). Note that an internal grating defined on a plane parallel to the external grating on an exposed side of the first portion and positioned where the first and second portions meet may be etched using means well known in the art.

In yet other embodiments, the compressor may comprise a geometric structure with two parallel diffraction gratings at an appropriate distance and a perfect retro-reflector that is located a certain distance from the second grating such that it retro-reflects any input pulse incident from the first grating to its point of origin. The space between the gratings and that between the retro-reflector may be filled with a fluid whose index of refraction is larger than the ambient contained within a glass vessel, wherein the surfaces of the glass vessel are coated with the required reflective material.

By way of example, and without intent to be limited thereby, an illustrative example is presented. The following parameters are chosen for calculating the typical size of a compressor system in both embodiments presented herein: initial stretched pulse width 1 ns; final compressed pulse width 1 ps; diffraction order m=−1; central wavelength of the input light: 1030 nm; spectral bandwidth of the input light: 80 nm; refractive index for the material 1.45 (fused silica), grating constant 600 nm. The resulting volume for a Treacy-type compressor is 7080 cc. For the new proposed uni-block compressor, the calculated volume of the first embodiment presented is 3390 cc, and can be as small as 2250 cc for the second embodiment presented. The compactness of the new uni-block compressor is thus evident. In this example, the size of the compressor can be reduced by two to three times, when either of the two embodiments presented herein used.

To take full advantage of the new compact, uni-block compressor in chirped-pulse amplification systems, it could be paired with a non-linearly chirped fiber Bragg grating for the pulse stretcher. A fiber Bragg grating is compact and suitable for moderate peak powers at the pre-amplification stages of a pulse stretcher. The cumulative group velocity dispersion of a properly designed fiber Bragg stretcher can be cancel led by a dispersion of opposite sign in the new compressor. When the two are exactly balanced, ultra-short, clean, high peak power pulses can be produced at the output of the compressor.

The use of solid blocks in which the grating and reflection elements are integrated provides two key benefits. The first is a higher index of refraction than that of the ambient air between the gratings of the compressor. This helps reduce the size of the compressor while retaining the same beam physics. The second benefit comes from the reflecting coatings on the surfaces of the bonded blocks. The coatings provide a mechanism for folding the optical path length within a compact volume. The distinguishing advantage of this invention is its substantial reduction of the overall volume of the optical compressor. A secondary benefit is its robustness to minor mechanical disturbances and relative ease of alignment.

The pulses in the returned output beam are temporally compressed to much shorter widths than what entered the compressor. Shortening of the physical distance between the gratings is one of the key essential features of the new compressor. The optical path length, however, is actually increased because of the folding of the light within the compressor block. Use of a solid uni-block structure with indices of refraction larger than the ambient reduces the longitudinal and transverse dimensions of the compressor.

The mathematical relationship between the geometry of the uni-block structure and the desired pulse compression ratio may given by the following equations:

$$L = (T_{initial} - T_{final}) \cdot$$

-continued $$\left\{ \begin{array}{c} \left[\frac{m^2\lambda_0\Delta\lambda}{cd^2\cos^3\gamma_{max}} + \frac{3m^2(\Delta\lambda)^2}{4cd^2}\left(\frac{1}{\cos^3\gamma_{max}} + \frac{m\lambda_0\sin\gamma_{max}}{d\cos^5\gamma_{max}}\right) - \right]^{-1} \\ \left[\frac{-m^2\lambda_0\Delta\lambda}{cd^2\cos^3\gamma_{min}} + \frac{3m^2(\Delta\lambda)^2}{4cd^2}\left(\frac{1}{\cos^3\gamma_{min}} + \frac{m\lambda_0\sin\gamma_{min}}{d\cos^5\gamma_{min}}\right)\right] \end{array} \right\},$$

where L is the grating separation, $T_{initial}$ is the initial pulse width, $T_{final}$ is the final pulse width, c is the velocity of light-, m is the grating order, $\Delta\lambda$ is the bandwidth, $\lambda_0$ is the central wavelength of the light, d is the grating constant.

$$\gamma_{max} = \arcsin\left(\frac{\lambda + \Delta\lambda/2}{d} - \sin\theta\right),$$

$$\gamma_{min} = \arcsin\left(\frac{\lambda - \Delta\lambda/2}{d} - \sin\theta\right).$$

θ is the angle of incidence into the compressor, and $$W = L \cdot (\gamma_{max} - \gamma_{min}).$$

where W is the width of the grating.

While two specific embodiments of the new compressor have been discussed for purposes of illustration, there are other alternative embodiments that fall within the scope of the claims appended. The invention is not intended to be limited to the details shown. Rather, various modifications may be made in the details without departing from the invention.

We claim:

1. An apparatus comprising:
    a structure of solid, optically transparent material consisting of a first portion of solid, transparent material of generally rectangular, cuboid shape and a second portion of indeterminate shape;
    wherein the first portion has a first grating etched on an external side thereof;
    wherein the second portion and first portion are joined at a plane defining a second grating, the plane being parallel to the external side of the first portion containing the first grating;
    wherein the structure is coated with a reflective material on all external surfaces except the external grated side of the first portion; and
    wherein the second portion defines one or more internal surfaces disposed such that a light beamlet entering the second portion from the first portion is incident on one of the one or more internal surfaces such that the beamlet is retro-reflected from the second portion back through the first portion.

2. The apparatus of claim 1 wherein the first portion and second portion comprise two separate blocks which have been atomically welded together.

3. The apparatus of claim 2 wherein the first and second portion are composed of the same material.

4. The apparatus of claim 1 wherein the first and second portions are part of a monolithic structure.

5. The apparatus of claim 1 wherein the reflective material is gold or a Bragg reflector.

6. The apparatus of claim 1 wherein the second portion is generally trapezoidal in shape.

7. The apparatus of claim 1 wherein the second portion is generally shaped as a heptahedron.

8. The apparatus of claim 7 wherein a first side of the heptahedron retro-reflects light beamlets that were reflected an even number of times as the beamlet traversed the first portion and wherein a second side retro-reflects light beamlets that were reflected an odd number of times as the beamlet traversed the first portion.

9. The apparatus of claim 1 wherein the first and second portions each have an index of refraction higher than the ambient.

10. The apparatus of claim 1 wherein an angle between any two surfaces of the second portion which do not intersect the first portion must be less than or equal to 90 degrees.

11. An apparatus comprising:
    a vessel, the internal surfaces of the vessel coated with a reflective material;
    a first diffraction grating, disposed in the vessel;
    a second diffraction grating, disposed in the vessel and separated from the first grating by a transverse distance;
    one or more reflectors, disposed such that a light beamlet exiting the second diffraction grating is incident on one of the one or more reflectors such that the beamlet is retro-reflected; and
    an optically transparent fluid, disposed in the vessel.

12. The apparatus of claim 11 wherein at least one of the one or more reflectors is a retroreflector located a distance from the second grating such that an input light pulse from a point of origin incident from the first grating is retro-reflected to the point of origin.

13. The apparatus of claim 11 wherein the vessel is composed of glass.

14. The apparatus of claim 9 wherein the optically transparent fluid has an index of refraction higher than ambient.

15. The apparatus of claim 9 wherein the reflective material is gold.

16. The apparatus of claim 1 wherein the first and second portion are composed of a dielectric material.

* * * * *